United States Patent [19]
Bowman et al.

[11] 3,807,362
[45] Apr. 30, 1974

[54] SCOOP AND COOP

[76] Inventors: Van Ray Bowman, Ware St.; George E. Graham, Rt. No. 6, both of Carthage, Miss. 39051

[22] Filed: Mar. 9, 1972

[21] Appl. No.: 233,106

[52] U.S. Cl. .............................................. 119/151
[51] Int. Cl. .......................................... A01k 29/00
[58] Field of Search .......... 119/82, 151; 37/119, 55, 37/120; 214/145

[56] References Cited
UNITED STATES PATENTS

| | | | |
|---|---|---|---|
| 589,047 | 8/1897 | Thomas | 37/55 UX |
| 3,672,335 | 6/1972 | Sanders | 119/82 |
| 1,020,426 | 3/1912 | Jensen | 37/120 X |

*Primary Examiner*—Hugh R. Chamblee
*Attorney, Agent, or Firm*—Scrivener Parker Scrivener & Clarke

[57] ABSTRACT

A method and apparatus for automatically entrapping, storing and dispensing poultry is disclosed for use in the commercial raising of broiler chickens and other poultry. More particularly, a poultry scoop is disclosed having bottom, side and rear walls, wherein the scoop contains an open front end for receiving poultry as the scoop is moved horizontally over a confined surface. The poultry is entrapped within the scoop by moving a lid into a closed position over the open front end of the scoop; thereafter, the poultry may be transferred to a storage bin designed for selective dispensing of the poultry into standardized shipping crates. By removing the lid as well as the side walls from the scoop, the remaining bottom and rear walls may be used as a litter pickup device.

3 Claims, 5 Drawing Figures

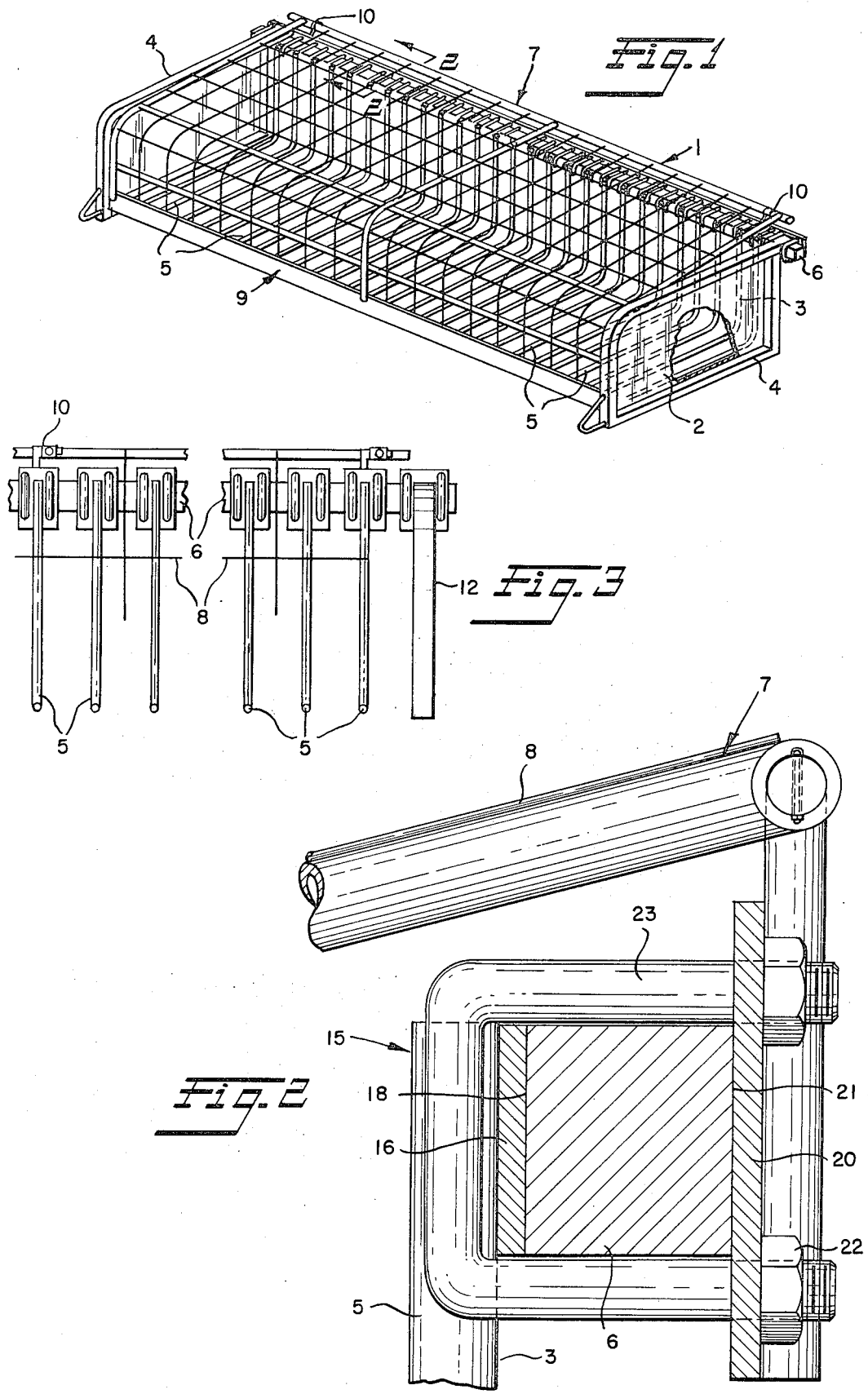

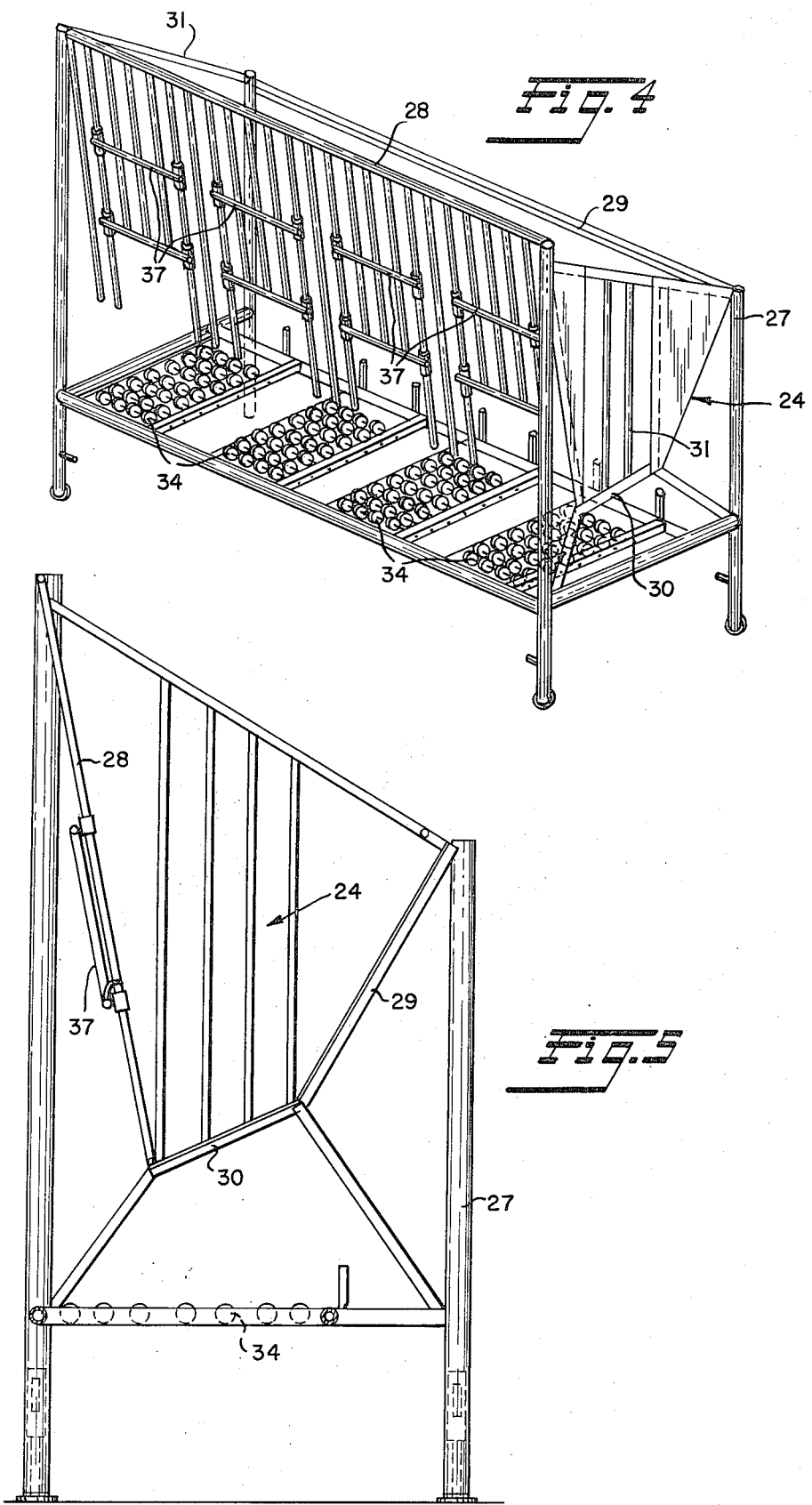

3,807,362

SCOOP AND COOP

BACKGROUND OF THE INVENTION

This invention relates to an apparatus and method for automatically entrapping, storing, and dispensing poultry.

In the past removal of mature broilers from a confined production area has required manual trapping of the live poultry. Such manual labor significantly contributed to the cost of producing broiler chickens.

OBJECTS OF THE INVENTION

It is an object of this invention to provide an apparatus and method for automatically gathering and storing poultry scattered over a confined horizontal surface area, such as a poultry production house floor, whereby significant savings can be realized through reduced labor costs.

It is another object of this invention to provide a method for automatically entrapping live poultry scattered over a confined surface area by moving an enclosed scoop having a poultry receiving front opening over the confined surface area at a distance above the surface of about 1 inch and by bringing one portion of the poultry container into engagement with the poultry at a speed which is sufficient to urge the poultry into the poultry receiving opening but which is not so large as to cause injury to the poultry which is so engaged.

Yet another object of this invention is to provide a poultry scoop including a container having an integral bottom and rear wall combined with a removable lid and opposed side walls, wherein the lid can be pivoted from a normally open position allowing poultry to pass through the forward end of the scoop to a closed position entrapping poultry within the scoop.

Still another object of this invention is to provide means for connecting parallel L-shaped rods to a horizontal bar to form the bottom and rear walls of the poultry scoop which can be used both for entrapping poultry and for picking up poultry litter.

Still another object of this invention is to provide a poultry coop for temporarily storing poultry and for discharging poultry into standardized shipping crates comprising a frame, storage bin with downwardly convergent front and rear walls for gravity feeding poultry toward a plurality of horizontally disposed poultry discharge openings, and support means connected with the lower portion of the frame for supporting a plurality of standardized containers in horizontal side by side relation beneath said bottom wall and extending at least partially below and forward of said discharge openings, respectively.

The above and additional objects of this invention will become apparent from the following description.

BRIEF DESCRIPTION OF THE DRAWINGS

FIG. 1 illustrates a perspective view of a poultry scoop according to this invention;

FIG. 2 is a cross sectional view of the horizontal bar of the poultry scoop of FIG. 1 taken along lines 2—2;

FIG. 3 is a broken front elevational view of the poultry scoop of FIG. 1 adapted for use as a poultry litter scoop;

FIG. 4 illustrates a perspective view of a portable poultry coop according to this invention; and FIG. 5 is a side elevational view of the poultry coop of FIG. 4.

DESCRIPTION OF THE PREFERRED EMBODIMENT

FIG. 1 illustrates an apparatus for automatically removing poultry from a confined horizontal surface area including a portable poultry scoop 1 which can be attached to the front end of a small tractor or fork lift of size sufficient to move the load, but small enough to operate within the confined area. The poultry scoop comprises a bottom wall 2, rear wall 3, and opposed side walls 4. The bottom and side walls are formed by a plurality of L-shaped rods 5 rigidly held in parallel spaced relationship by means of a horizontally extending bar 6. The pair of opposed side walls 4 is removably attached to the horizontal bar while a lid member 7 having a top portion 8 and front portion 9 is pivotally attached to the horizontal bar 6 by means of upstanding brackets 10. The bottom and opposed side walls of the integral base form an opening at the front end of the scoop through which poultry such as broiler chickens may pass. To entrap poultry within the scoop, the lid member 7 is pivoted upwardly to a normally open position to uncover the front end opening of the scoop. The scoop is next displaced horizontally over the confined surface area at a distance of about one inch above the surface. As the ends 11 of rods 5 come into contact with the poultry, the poultry is urged into the scoop. It is an important feature of this invention that the means for engaging the poultry be designed so as to urge the poultry into the scoop without causing injury. Accordingly, the poultry engaging means should be located close to the ground, preferably about one inch therefrom, and may consist of any blunt edged surface capable of applying force to the lower portion of the poultry. Obviously, the speed of movement must be sufficiently slow as not to cause injury of any kind to the poultry. It has been found that optimum results are obtained when the method is carried out in the absence of illumination since chickens, particularly mature chickens, tend to remain sedentary in the absence of light. After the desired number of poultry is obtained, the lid 7 is pivoted downwardly to close off the front end opening and entrap the poultry therein.

The poultry scoop is also adapted for use as a poultry litter pickup device. For this purpose, the side walls 4 and lid 7 can be removed from bar 6 leaving only the parallel rods 5 shown in full lines in FIG. 3, wherein the vertical portions 12 are shown longitudinally disposed and the horizontal portions 14 are shown edge on. To use as a litter scoop the entire assembly is merely tilted and lowered to bring the free ends of the horizontal portions 14 into engagement with the production house floor for scooping up the poultry litter.

FIG. 2 illustrates means 15 for allowing the rod members 5 to be adjustably spaced along the longitudinal extent of horizontal bar 6. In particular, FIG. 2 is a cross-section of bar 6 taken along lines 2—2 of FIG. 1. As illustrated in FIG. 2 a first connection plate 16 is permanently in contact with a first vertical surface 18 of bar 6 and is equal in vertical height to the height of surface 18. As best seen in FIG. 3, each first connecting plate 16 extends horizontally beyond the integrally attached vertical rod portion 12 on both sides. A second connecting plate 20 is in engagement with a second vertical surface 21 opposite the first vertical surface of bar 6. The second connecting plate 20 extends vertically above and below bar 6. A U-bolt fastener 23 extends around each horizontal side extension of plate 16, and the ends of the U-bolts pass through holes in the second connecting plate 20, whereby the two plates can be pulled into gripping engagement with the opposed vertical surfaces of bar 6 by means of nuts 22. Obviously rods 5 may be adjustably moved along the horizontal bar merely by loosening the nuts and moving the rod to the position desired. For picking up poultry litter such as waste and by-products, it is desirable to space the rods about 3 inches between centers while for poultry gathering purposes a 4 inch spacing a desirable.

For use in conjunction with the poultry scoop of FIG. 1, a coop or storage apparatus is disclosed in FIGS. 4 and 5. The coop includes a storage bin 24 supported on the upper portion of a frame 27 and contains an opening at its upper end for receiving poultry and a plurality of horizontally disposed discharge openings adjacent the lower end for discharging poultry contained within the storage bin. The storage bin is formed by a front wall 28, rear wall 29, bottom wall 30, and opposed side walls 31 which define a storage chamber within the bin. The side walls 31 are generally vertical, while the front and rear walls are downwardly convergent and the bottom wall slopes downwardly toward the discharge openings includes within front wall 28. The sloping front, rear and bottom walls cause the live poultry to be gravity fed toward the plurality of discharge openings. Support means are connected to the lower portion of the frame 27 for supporting a plurality of standardized containers in horizontal side by side relation beneath the bottom wall of the storage bing. The support means include a plurality of support stations 34 designed to support a standardized shipping crate such as a 36 inches ×24 inches ×10 inches wooden crate conventionally used for transportation of broiler chickens. Each station includes a bed of rollers for reducing friction. Because the crates can be located beneath the bottom wall in a position extending at least partially below and forward of said discharge openings, respectively, the poultry may be easily and conveniently transferred from the storage bin to the crates. After a sufficient number of poultry have been transferred to a crate, the discharge openings may be closed by closure means such as slidable doors 37. The walls and slidable doors of the storage bin can all be made of spaced apart elongated metal rods extending between frame supports as disclosed in FIGS. 4 and 5.

An automatic poultry entrapping and dispensing method has been disclosed for significantly reducing the time and labor now spent in catching mature poultry from within confined production areas. The method is carried out both easily and harmlessly by means of a scoop incorporating a minimum of working parts adapted for use on conventional farm machinery. In addition, a novel storage coop is disclosed for providing a simple method for gravity feeding the entrapped poultry into standardized shipping crates.

We claim:

1. Apparatus for entrapping live poultry randomly disposed over a confined horizontal surface area, comprising
    a. a scoop (1) including bottom, rear and opposed side walls, said scoop being open at its forward end to permit entry of poultry into said scoop when said scoop is displaced horizontally over the confined surface area; and
    b. means (7) for closing the open forward end of said scoop to entrap poultry within said scoop, wherein said closing means comprises a lid including a generally horizontal top portion (8) and a generally vertical front portion (9), said horizontal portion being pivotally connected to said scoop rear wall, whereby said vertical front portion may be moved from a normally open position allowing poultry to pass through the forward end of said scoop to a closed position entrapping poultry within said scoop, said front portion, when closed extending upwardly from said bottom wall a distance substantially equal to the height of said side walls, said top and front portions thereby forming an L-shaped structure.

2. Apparatus according to claim 1 wherein said rear and bottom walls comprise
    1. a plurality of L-shaped rods (5) each said rod including a horizontal leg portion (14) and a vertical leg portion (12);
    2. a horizontal bar (6) extending between said side walls, said bar including a pair of opposed vertical surfaces; and
    3. means (15) for connecting each said L-shaped rod to said horizontal bar, said means including
        a. a first connecting plate (16) associated with each said L-shaped rod, said first plate being permanently attached to said vertical leg portion of said each L-shaped rod and extending horizontally beyond said vertical leg portion, said first connecting plate having a vertical height equal to the vertical height of one said vertical bar surface and being in contact therewith; and
        b. a second connecting plate (20) associated with each said L-shaped rod, said second plate engaging said other vertical surface of said bar and extending vertically above and below said bar; and
        c. a pair of adjustable U-shaped fasteners (23) for adjustably holding said first and second plates in gripping engagement with said horizontal bar, whereby said rods may be selectively adjusted in the horizontal direction along said bar by selectively releasing the gripping engagement of said fasteners.

3. Apparatus according to claim 1 wherein said opposed side walls and said pivotal lid are removably attached to said scoop, whereby said bottom portion may be used as a scoop for poultry litter pickup upon removal of said opposed side walls and said pivotal lid.

* * * * *